US012454652B2

(12) United States Patent
Sandoval et al.

(10) Patent No.: US 12,454,652 B2
(45) Date of Patent: Oct. 28, 2025

(54) ALKYLATED, AMINATED AND ALKOXYLATED MACROMOLECULES WITH INTEGRATED TRIFUNCTIONAL PROPERTIES FOR THE REMOVAL OF PETROLEUM EMULSIONS

(71) Applicant: INSTITUTO MEXICANO DEL PETRÓLEO, Mexico City (MX)

(72) Inventors: César Andrés Flores Sandoval, Mexico City (MX); Flavio Salvador Vázquez Moreno, Mexico City (MX); Fernando Alvarez Ramírez, Mexico City (MX); Gerardo Zavala Olivares, Mexico City (MX); Citlally Janinne Vargas Martínez, Mexico City (MX); Jessica Valeria Fuentes Santiago, Mexico City (MX); Edgar Benedicto Zamora Guerrero, Mexico City (MX); Enrique Cevada Maya, Mexico City (MX); Erika Gómez Buendía, Mexico City (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 0 days.

(21) Appl. No.: 17/494,436

(22) Filed: Oct. 5, 2021

(65) Prior Publication Data

US 2022/0106530 A1 Apr. 7, 2022

(30) Foreign Application Priority Data

Oct. 5, 2020 (MX) .................... MX/a/2020/010501

(51) Int. Cl.
*C10G 33/04* (2006.01)
*C08F 220/18* (2006.01)
(Continued)

(52) U.S. Cl.
CPC ............ *C10G 33/04* (2013.01); *C08F 220/18* (2013.01); *C08F 220/28* (2013.01);
(Continued)

(58) Field of Classification Search
CPC .. C08F 220/34; C08F 220/26; C08F 220/281; C08F 220/28; C08F 220/282;
(Continued)

(56) References Cited

U.S. PATENT DOCUMENTS

2020/0270490 A1 * 8/2020 Shiraishi ................ C09J 133/26

FOREIGN PATENT DOCUMENTS

WO WO-2019087816 A1 * 5/2019 .......... C08F 220/281

* cited by examiner

*Primary Examiner* — Joseph S Del Sole
*Assistant Examiner* — David L Miller
(74) *Attorney, Agent, or Firm* — FisherBroyles, LLP; Jason P. Mueller

(57) ABSTRACT

The present disclosure belongs to the field of chemical products for petroleum conditioning, in particular demulsifying agents. This disclosure concerns the application of terpolymers based on combinations of alkyl acrylates, aminoalkyl acrylates, and alkoxyalkyl acrylates, to destabilize water-in-oil (W/O) emulsions, in order to remove the emulsified water and salts dissolved in it, specifically, in the triphasic separation units for crude oils with API densities from 8 to 40° API.

6 Claims, 11 Drawing Sheets
(6 of 11 Drawing Sheet(s) Filed in Color)

(51) Int. Cl.
*C08F 220/28* (2006.01)
*C08F 220/34* (2006.01)
*C08L 33/08* (2006.01)
*C08F 220/26* (2006.01)

(52) U.S. Cl.
CPC ............ *C08F 220/34* (2013.01); *C08L 33/08* (2013.01); *C08F 220/1802* (2020.02); *C08F 220/1803* (2020.02); *C08F 220/1804* (2020.02); *C08F 220/1805* (2020.02); *C08F 220/1806* (2020.02); *C08F 220/1808* (2020.02); *C08F 220/1811* (2020.02); *C08F 220/1812* (2020.02); *C08F 220/26* (2013.01); *C08F 220/281* (2020.02); *C08F 220/282* (2020.02); *C10G 2300/206* (2013.01); *C10G 2300/302* (2013.01); *C10G 2300/308* (2013.01)

(58) Field of Classification Search
CPC .............. C08F 220/18; C08F 220/1802; C08F 220/1803; C08F 220/1804; C08F 220/1805; C08F 220/1806; C08F 220/1808; C08F 220/1811; C08F 220/1812; C08F 220/1813; C10G 33/04
See application file for complete search history.

ALKYLATED, AMINATED AND ALKOXYLATED MACROMOLECULES WITH INTEGRATED TRIFUNCTIONAL PROPERTIES FOR THE REMOVAL OF PETROLEUM EMULSIONS

RELATED APPLICATIONS

This patent application claims priority under 35 U.S.C. Section 119 to Mexican Patent Application MX/a/2020/010501, filed Oct. 5, 2020, the entire disclosure of which is incorporated herein by reference.

TECHNICAL FIELD

The present disclosure belongs to the field of chemical products for petroleum conditioning, in particular demulsifying agents. This disclosure concerns to the application of terpolymers based on combinations of alkyl acrylates, aminoalkyl acrylates, and alkoxyalkyl acrylates, to destabilize water-in-oil (W/O) emulsions, in order to remove the emulsified water and salts dissolved in it, specifically, in the triphasic separation units for crude oils with API densities from 8 to 40° API.

BACKGROUND OF THE DISCLOSURE

Nowadays, oil industry faces the extraction of heavy and extra-heavy crude oils, with a high content of water and salts. In addition to the water naturally present in the reservoirs, emulsions are also formed due to the water injected during enhanced recovery processes or the water added to remove the salt dispersed in crude oil. In any case, water is frequently found as emulsion, which, because of the high content of natural surfactants that have a stabilizing role, becomes complex to be removed, presenting important consequences during the transportation and refining of crude oil.

Although light crude oils, because of their low asphaltene content weakly stabilize water-in-oil emulsions, they are frequently mixed with heavy crude oils for operational and production reasons. Heavy crude oils, even in low amounts, provide asphaltenes of high molecular mass that strongly stabilize water droplets, leading to emulsions that are extremely difficult to remove.

The destabilization of the water-in-oil (W/O) emulsions is carried out by adding demulsifying chemical products, mainly triblock bipolymers based on PEO-PPO-PEO [1-3]. However, in their use as demulsifying agents, these compounds are applied as a mixture of at least three triblock polyethers of different molecular masses and compositions; besides, these show chemical instability under acid conditions. Additionally, since the synthesis process is complex, and combining the fact that the production of ethylene oxide has decreased in some countries, there has been an invariable increase in the cost of the final product.

The chemical degradation by acid stimulation conditions has been solved by means of the functionalization of triblock bipolymers with secondary amines, tertiary amines, ionic liquids, and acrylic derivatives [4-9]. However, despite the high performance of these demulsifying agents, the functionalization process involves an additional reaction stage, and consequently, the increment in the cost of final product. For this reason, several research groups have ventured on the synthesis of dehydrating agents for crude oils that are more efficient and accessible both chemical and economically.

Among the wide variety of chemical products that have been evaluated worldwide as crude oil dehydrating agents, it has been reported the demulsifying activity of polymers based on acrylics, amines, acid derivatives, and other chemical compounds. U.S. Pat. No. 7,470,744 [10] refers to the synthesis of copolymers useful as demulsifiers and clarifiers based on a combination of monomers: aromatic, acrylic, vinylic with ionizable groups and a hydrophilic monomer; applied directly as latex. However, it is only referred to the evaluation procedure as demulsifiers; according to the inventors, these products present a good performance, although without mentioning water removal efficiencies. The fact that these demulsifiers are applied in the crude oil streams as an aqueous dispersion makes difficult their diffusion in the organic phase.

On the other hand, U.S. Pat. No. 10,793,783 [11] describes the synthesis and use of random alkylacrylic-carboxyalkylacrylic bipolymers of controlled molecular mass as demulsifiers for crude oil; these bipolymers were assessed in extra-heavy crude oils and displayed superior demulsifying efficiency than a commercial formulation based on block polyethers, with a completely homogeneous breakdown and good clarification of the aqueous phase. Due to their chemical nature, these bipolymers show high chemical stability under acid conditions.

In the same vein of idea, vinylic monomers have been used for the synthesis of demulsifiers of water-in-crude oil (W/O) emulsions. U.S. Pat. No. 4,626,379 [12] mentions that an oxyalkylation is required to obtain random copolymers that subsequently react with a vinylic monomer, pointing out that it could be any unsaturated monomer capable of reacting by free radical polymerization and with mixtures of oxyalkylated reactants. The aforementioned demulsifiers showed a good dehydrating performance, although water removal efficiencies are not detailed.

Regarding demulsifiers based on acrylics, U.S. Pat. No. 5,472,617 [13] protects the synthesis by esterification of acrylic acids, employing amines as neutralizers of the catalyst used in the esterification and adding hydroquinone monomethyl ether as stabilizer to obtain crude oil demulsifying copolymers.

For its part, Zamora in the master's thesis "*Synthesis, characterization and evaluation of acrylic copolymers and terpolymers as dehydrating agents of crude oil*" [14] describes the good performance as demulsifiers of terpolymers based on acrylic and methacrylic monomers in heavy crude oils. However, the chemical structures or the proportions of the employed monomers for the synthesis of these terpolymers are not mentioned. Similarly, the thesis "*Synthesis and evaluation of random acrylic terpolymers for the dehydration of extra-heavy crude oils*" by Vargas [15] describes the synthesis and evaluation of random acrylic terpolymers, although it is not possible to infer the combinations of the acrylic monomers that were used in the polymerization to prepare the macromolecules capable of dehydrating extra-heavy crude oils.

U.S. Pat. No. 4,741,835 [16] reports terpolymers based on alkylacrylates and alkylacrylamides as breakers of oil-in-water (O/W) emulsions, synthesized by micellar free radical terpolymerization. These functionalized hydrophobic terpolymers display a better performance than conventional polymers for the removal of oil, resulting in a good clarification of the remaining water from the dehydration process.

On the other hand, the use of acrylic and amino monomers in emulsion polymerization is reported in U.S. Pat. No. 5,021,167 [17]; however, a serious drawback is the fact that the produced polymer is water-soluble and is used as clarifier for oil-in-water (O/W) dispersions. Similarly, U.S. Pat. No. 5,032,285 [18] protects a polymer used for the breaking of inverse emulsions—oil-in-water (O/W)—; this patent mentions that it can be a homopolymer or contain more than one monomer, and at least 40 mol % of one of them must be aminated. These polymers are water-soluble if the water pH is lower than 8. Their application to treat water/crude oil emulsions is restricted due to the difficulty that would imply their dosage in crude oil streams.

Compounds based on acrylate, polyether and polyols described in U.S. Pat. No. 4,316,808 [19] contain in their structure aminated, acrylate and ether moieties of diverse nature. It is important to point out that these polymers are thin-film scattering agents that contain hydrophilic and lipophilic moieties. It is also reported that these polymers have application as demulsifiers and recovery fluids of crude oil.

Unlike the documents mentioned above, the present disclosure is related to novel random terpolymers based on alkyl acrylate-aminoalkyl acrylate-alkoxyalkyl acrylate, their obtention process and use as demulsifying agents for crude oil. The three monomers that comprise the random acrylic terpolymer make of it a trifunctional molecule (breaker of water-in-crude oil (W/O) emulsions, coalescer of water droplets, and clarifier of the removed aqueous phase). The synthesis of these crude oil demulsifiers is carried out through semi-continuous emulsion polymerization process, under strict monomer starved feed conditions, based on the procedure developed at the Mexican Institute of Petroleum, described in the Mexican Patents MX 338861 B [20] and MX 201314352 [21], and in the U.S. Pat. No. 9,120,885 [22]. It should be noted that, for the preparation of these novel terpolymers, some modifications in the synthesis process were made, which are detailed in following sections of this document. The random distribution of the terpolymers of present disclosure is ensured, as has been previously mentioned, by supplying the reactants under monomer starved conditions. Moreover, chain transfer agents are used to carefully control the average molecular mass of the polymer chains, since this molecular parameter has a huge impact over the dehydration of crude oil. The synthesis conditions of the terpolymers were adjusted, in each case, in terms of composition and molecular mass; thus, their physicochemical characteristics were optimized for their evaluation in light, heavy and extra-heavy crude oils. It should be pointed out that these novel terpolymers are soluble in the organic phase; therefore, these are solubilized in the crude oil and cannot be dragged by the removed aqueous phase. Due to their chemical structure, the terpolymers object of this disclosure are resistant to acid environment, such as those occurring during periodic acid stimulation operations of production wells. In addition to the aforementioned products, the trifunctionality of these terpolymers results in a better cost-benefit ratio, compared with commercial demulsifiers for crude oil currently used. Finally, only one basic is used for the removal of emulsified water, in contrast with the formulations based on polyethers, where at least three basics are used.

The following references provide further background.

[1] W. Toussaint, H. Fife. Mixtures of polyoxyalkylene diols and methods of making such mixtures. U.S. Pat. No. 2,425,845 (1947).

[2] J. Roy. Phase separation process. U.S. Pat. No. 3,334,038 (1967).

[3] J. Wu, Y. Xu, T. Dabros, H. Hamza. Effect of EO and PO positions in nonionic surfactants on surfactant properties and demulsification performance. Colloids and Surfaces A: Physicochemical and Engineering Aspects 252 (2005) 79-85.

[4] E. Flores-Oropeza, C. A. Flores-Sandoval, R. Reyes-Martínez, J. G. Hernández-Cortez, A. López-Ortega, L. V. Castro-Sotelo, F. Álvarez-Ramírez, A. Estrada-Martínez, F. S. Vázquez-Moreno, Dehydrating and desalting compositions of crude oils, using triblock copolymers α,ω-bifunctionalized with amines. U.S. Pat. No. 9,745,521 (2017).

[5] G. Cendejas-Santana, E. A. Flores-Oropeza, L. V. Castro-Sotelo, A. Estrada-Buendia, M. Lozada-Cassou, F. S. Vázquez-Moreno. Demulsifying and dehydrating formulations for heavy crude oils based on block copolymers bifunctionalized with amines. U.S. Pat. No. 8,815,960 (2014).

[6] E. A. Flores-Oropeza, L. V. Castro-Sotelo, A. López-Ortega, J. G. Hernández-Cortéz, F. Álvarez-Ramírez, A. Estrada-Martínez, F. S. Vázquez-Moreno. Synergistic formulations of functionalized copolymers and ionic liquids for dehydrated and desalted of medium, heavy and extra heavy crude oils. U.S. Pat. No. 9,587,182 (2017).

[7] C. A. Flores-Sandoval, E. A. Flores-Oropeza, A. López-Ortega, J. G. Hernández-Cortéz, A. Estrada-Buendia, L. V. Castro-Sotelo, R. Reyes-Martínez, F. Álvarez-Ramírez, A. Estrada-Martínez, F. S. Vázquez-Moreno. Scale-up process of bifunctionalized triblock copolymers with secondary and tertiary amines, with application in dewatering and desalting of heavy crude oils. U.S. Pat. No. 10,125,226 (2018).

[8] J. V. Fuentes-Santiago, E. B. Zamora-Guerrero, F. Álvarez-Ramírez, G. Zavala-Olivares, G., A. López-Ortega, F. S. Vázquez-Moreno, C. A. Flores Sandoval. Bipolimeros tribloques POE-POP-POE, con terminaciones anfotéricas, como agentes desemulsionantes de aceites crudos pesados. Mexican Patent Application MX/a/005132 (2019).

[9] J. V. Fuentes, E. B. Zamora, R. Mariath, Z. Li, Z., Xu, F. Vázquez, C. A. Flores. Dehydrating heavy crude oils with new amphoteric block bipolymers. Energy & Fuels 34 (2020) 4307-4317.

[10] J. Behles. Copolymers useful as demulsifiers and clarifiers. U.S. Pat. No. 7,470,744 (2008).

[11] C. A. Flores-Sandoval, M. A. Chavez-Mora, E. B. Zamora-Guerrero, A. López-Ortega, G. Zavala-Olivares, F. Álvarez-Ramírez, F. S. Vázquez-Moreno. Water/crude oil removers based on alkylacrylic-carboxyalkylacrylic random copolymers of controlled molecular mass. U.S. Pat. No. 10,793,783 (2019).

[12] R. S. Buriks, J. G. Dolan. Demulsifier composition and method of use thereof. U.S. Pat. No. 4,626,379 (1986).

[13] K. Barthold, R. Baur, S. Crema, K. Oppenlaender, J. Lasowski. Method of demulsifying crude oil and water mixtures with copolymers of acrylates or methacrylates and hydrophilic comonomers U.S. Pat. No. 5,472,617 (1995).

[14] Edgar Benedicto Zamora Guerrero. Sintesis, caracterización y evaluación como agentes deshidratantes de petróleo de copolimeros y terpolimeros acrílicos. Master in Science thesis, Instituto Mexicano del Petroleo (IMP), 2018, pp. 232.

[15] Citlally Janinne Vargas Martínez. Chemical Engineering thesis. Sintesis y evaluación de terpolimeros acrílicos aleatorios para el deshidratado de aceites crudos extrapesados, Universidad Veracruzana (UV)—Faculty of Chemical Sciences, 2017, pp 41.

[16] D. Jacques, J. Bock, P. L. Valint. Oil-in-water emulsion breaking with hydrophobically functionalized cationic polymers. U.S. Pat. No. 4,741,835 (1988).

[17] M. L. Braden, S. J. Allenson. Method for separating liquid from water using amine containing polymers. U.S. Pat. No. 5,021,167 (1991).

[18] M. L. Braden, S. J. Allenson. Reverse emulsion breaking method using amine containing polymers. U.S. Pat. No. 5,032,285 (1991).

[19] C. M. Jr. Blair. Method for breaking petroleum emulsions and the like using micellar solutions of thin film spreading agents comprising an acrylated polyether polyol. U.S. Pat. No. 4,316,808 (1982).

[20] M. Lozada-y-Cassou, E. A. Flores-Oropeza, G. Cendejas-Santana, L. V. Castro-Sotelo, F. S. Vázquez-Moreno. Formulacion de polimeros aleatorios para mejorar flujo de crudos del petróleo. Mexican Patent No. MX 338861 (2016).

[21] A. López-Ortega, A. Estrada-Buendia, A. Estrada-Martínez, C. A. Flores-Sandoval, E. I. Hernández-Carbajal, E. Cevada-Maya, F. Álvarez-Ramírez, F. S Vázquez-Moreno. Formulaciones de homopolimeros base acrilatos de alquilo empleadas como antiespumantes en aceites crudos pesados y súper pesados. Mexican Patent No. MX 378417 (2020).

[22] L. V. Castro-Sotelo, E. A. Flores-Oropeza, G. Cendejas-Santana, M. Lozada-Cassou, F. S. Vázquez-Moreno. Formulations of random polymers for improving crude petroleum flow. U.S. Pat. No. 9,120,885 (2015).

SUMMARY OF THE DISCLOSURE

As reported in the literature, one of the most challenging problems in the oil industry is the extraction of crude oils with significant amounts of water and salts. Additionally, the use of commercially available demulsifying agents that can undergo chemical degradation by acid stimulation operations of wells does not guarantee the total elimination of both components. Based on the above, novel random terpolymers have been synthesized from a monomer of alkyl acrylate type, one of aminoalkyl acrylate type, and one of alkoxyalkyl acrylate type. The synthesis of the novel terpolymers was carried out by means of emulsion polymerization technique in a semi-continuous process under starved feed conditions; thus, ensuring both the homogeneity of the polymer chains and the random distribution of the employed monomers. For their ending use as demulsifying agents, there were prepared solutions of each terpolymer using organic solvents with boiling point in the range from 35 to 200° C., which were dosed within the range from 5 to 2 000 ppm.

About the performance of the terpolymers as demulsifying agents, it can be observed that these have excellent properties for breaking the water/oil interface, coalescence of water droplets and clarification of the aqueous phase, surpassing bipolymers based on polyethers reported in the literature [3,4], as well as other acrylic and vinyl acrylic bipolymers from previous reports [11,13,14]. This represents a great advantage of the novel random terpolymers based on alkyl acrylate, aminoalkyl acrylate and alkoxyalkyl acrylate, since it implies a greater viability for their integration as new commercial demulsifiers. Additionally, the chemical structure of the novel terpolymers gives them resistance to chemical degradation caused by drastic pH variations during acid stimulation operations of wells.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Finally.

DETAILED DESCRIPTION

Figure 1:
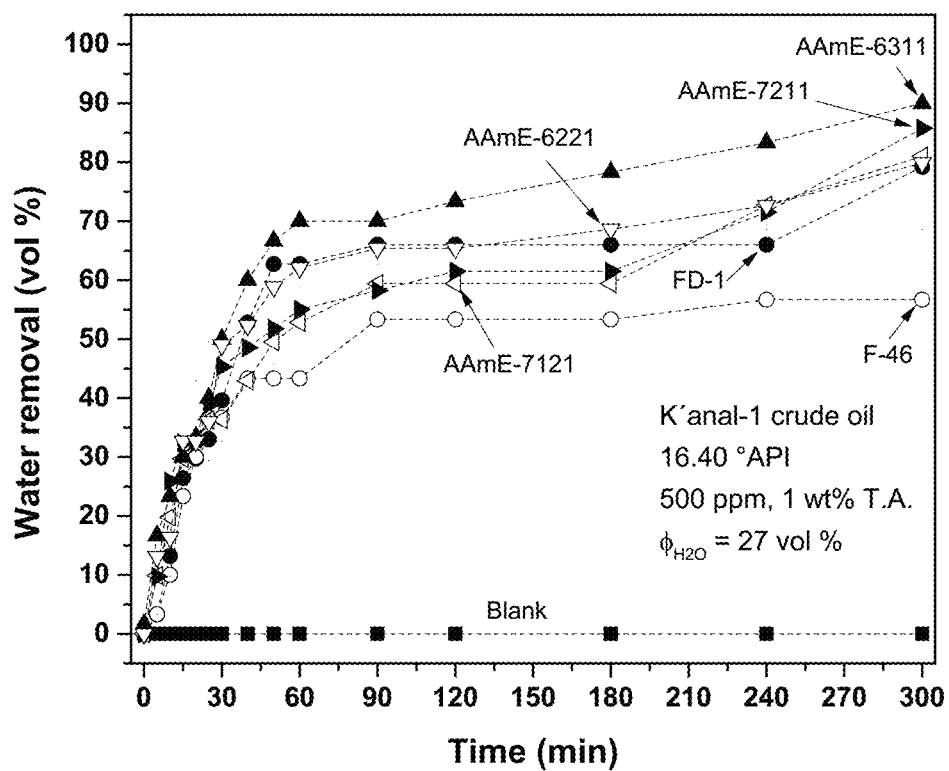
FIG. 1 shows the water removal efficiency of the random terpolymers of AAmE-1 series based on alkyl acrylate, aminoalkyl acrylate and alkoxyalkyl acrylate of different monomeric composition, synthesized with 1 wt % of transfer agent and dosed in K'anal-1 crude oil (16.4° API) at a concentration of 500 ppm.

The present disclosure is related to novel random terpolymers based on alkyl acrylate, aminoalkyl acrylate and alkoxyalkyl acrylate, their obtention process and use as demulsifying agents of crude oil.

The novel random terpolymers based on alkyl acrylate, aminoalkyl acrylate and alkoxyalkyl acrylate are synthesized as latex by means of emulsion polymerization in a semi-continuous process, method that is widely described in the Mexican Patent MX 338861, considering the following modifications: in the present disclosure the terpolymers are synthesized as latex with a polymer content between 15.0 and 45.0 wt %.

The addition of the monomers is carried out from an addition tank to form a pre-emulsion according to the following proportions: the alkyl acrylate monomer is in a range from 50.0 to 99.0 wt %, the aminoalkyl acrylate monomer is in an interval from 0.5 to 49.5 wt % and the alkoxyalkyl acrylate monomer is between 0.5 and 49.5 wt %. %.

The initiator is added in proportions from 0.5 to 10.0 wt % regarding the total amount of monomers in the system, while the surfactant is added in a proportion between 0.5 and 20.0 wt % regarding the total mass of monomers in the system.

The initiator solution is dosed from a second addition tank to the main reactor in order to establish a continuous flow of free radicals in the system during the reaction time.

The main reactor can be at a temperature between 45 and 95° C.; while the two addition tanks must remain at room temperature. The initiator and the pre-emulsion must be fed simultaneously to the main reactor during the reaction period, which can vary between 15 and 360 minutes.

The obtained terpolymer as latex is leaded to a distillation process at a temperature between 80 and 120° C. in order to obtain a viscous liquid, which is subsequently dissolved in a suitable organic solvent with boiling point between 35 and 200° C., such as: dichloromethane, methanol, ethanol, isopropanol, chloroform, benzene and its derivatives, toluene, xylene, jet fuel and naphtha; individually or as a mixture, for its final application as a demulsifying agent in crude oils from 8 to 40° API. The concentration of the terpolymer in solution can fluctuate from 5.0 to 50.0 wt %; while the formulations are dosed at a concentration in a range from 5 to 2 000 ppm.

Scheme 1 displays the chemical structure of the different random acrylic terpolymers based on alkyl acrylate, aminoalkyl acrylate and alkoxyalkyl acrylate, comprised in the present disclosure:

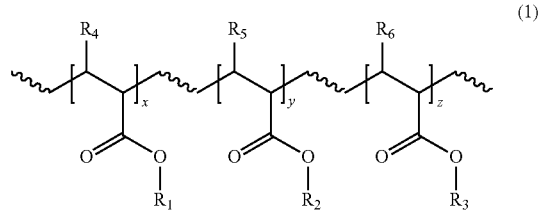

(1)

where:

$R_1$, $R_2$, $R_3$, $R_4$, $R_5$, and $R_6$ are independent radicals, represented by the groups mentioned below:

$R_1$=$CH_3$ (methyl), $C_2H_5$ (ethyl), $C_4H_9$ (n-butyl), $C_4H_9$ (iso-butyl), $C_4H_9$ (tert-butyl), $C_5H_{11}$ (pentyl), $C_6H_{13}$ (n-hexyl), $C_6H_{11}$ (di(ethylene glycol)ethyl ether), $C_8H_{17}$ (2-ethylhexyl), $C_9H_{19}$ (3,5,5-trimethylhexyl), $C_8H_{17}$ (n-octyl), $C_8H_{17}$ (iso-octyl), $C_8H_9$ (ethylene glycol phenyl ether), $C_{10}H_{21}$ (n-decyl), $C_{10}H_{21}$ (iso-decyl), $C_{10}H_{19}$ (10-undecenyl), $C_{10}H_{19}$ (tert-butylciclohexyl), $C_{12}H_{25}$ (n-dodecyl), $C_{18}H_{37}$ (n-octadecyl), $C_8H_9$ (2-phenoxyethyl), $C_3H_7O$ (2-methoxyethyl), $C_5H_{11}O_2$ (2-(2-methoxyethoxy)ethyl), $C_5H_9O$ (tetrahydrofurfuryl), $C_5H_9O$ (2-tetrahydropyranyl), $C_{13}H_{27}$ (tridecyl), or $C_{22}H_{45}$ (behenyl).

This aliphatic chain can contain heteroatoms of ether groups, as well as aromatic fragments like benzene or rings with heteroatoms as ether type.

$R_2$=$CH_4N$ (methylamine), $C_3H_6N$ (2-ethylamine), $C_3H_8N$ (3-propylamine), $C_4H_{10}N$ (2-(dimethylamino)ethyl), $C_6H_{14}N$ (2-(diethylamino)ethyl), $C_5H_{12}N$ (3-(dimethylamino)propyl), or $C_6H_{12}NO$ (N-morpholinyl ethyl). This aliphatic chain can contain from C1 to C25 carbons.

$R_3$=$C_2H_5O$ (methoxymethyl), $C_3H_7O$ (2-methoxyethyl), $C_4H_9O$ (2-ethoxyethyl), $C_4H_9O$ (3-methoxypropyl), $C_5H_{11}O$ (3-ethoxypropyl), $C_5H_{11}O_2$ (2-(2-methoxyethoxy)ethyl), or $C_8H_9O$ (2-phenoxyethyl). The alkoxyalkyl can include phenyls, cyclic or branched alkyl chains from C1 to C20.

$R_4$, $R_5$, and $R_6$=H (hydrogen) and/or $CH_3$ (methyl).

and where:

x=is a number from 4 to 900.

y=is a number from 4 to 900.

z=is a number from 4 to 900.

"x", "y", and "z" could appear as random sequences.

The number average molecular masses ($\overline{M}_n$) of the terpolymers are enclosed between 1 000 and 450 000 g·mol$^{-1}$.

Hereafter, the alkyl acrylic monomers employed to synthesize the random acrylic terpolymers object of this disclosure are described as example, which does not imply any limitation: methyl acrylate, ethyl acrylate, butyl acrylate, pentyl acrylate, iso-butyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, iso-decyl acrylate, decyl acrylate, lauryl acrylate, tridecyl acrylate, octadecyl acrylate, behenyl acrylate, methyl methacrylate, ethyl methacrylate, butyl methacrylate, pentyl methacrylate, iso-butyl methacrylate, tert-butyl methacrylate, hexyl methacrylate, 2-ethylhexyl methacrylate, 3,5,5-trimethylhexyl methacrylate, 4-tert-butylcyclohexyl methacrylate, octyl methacrylate, iso-decyl methacrylate, decyl methacrylate, lauryl methacrylate, tridecyl methacrylate, octadecyl methacrylate, and behenyl methacrylate. On the other hand, the aminoalkyl acrylate monomers culled for the disclosure were selected among the following: 2-aminoethyl acrylate, 2-aminoethyl methacrylate, 2-(dimethylamino)ethyl acrylate, 2-(dimethylamino)ethyl methacrylate, 3-aminopropyl acrylate, 3-aminopropyl methacrylate, 3-(dimethylamino)propyl acrylate, 3-(dimethylamino)propyl methacrylate, 2-(diethylamino)ethyl acrylate, 2-(diethylamino)ethyl methacrylate, 2-N-ethylmorpholine acrylate, 2-N-ethylmorpholine methacrylate, which does not imply any limitation. Finally, the alkoxyalkyl acrylate monomers selected for the synthesis of the terpolymers of the present disclosure were selected from the following, which does not imply any limitation: 2-methoxyethyl acrylate, 2-phenoxyethyl acrylate, di(ethylene glycol)ethyl ether acrylate, 2-methoxyethyl methacrylate, 2-phenoxyethyl methacrylate, di(ethylene glycol)ethyl ether methacrylate, 2-ethoxyethyl acrylate, 2-ethoxyethyl methacrylate, 2-butoxyethyl acrylate, 2-butoxyethyl methacrylate, 2-ethoxymethyl acrylate, 2-ethoxymethyl methacrylate.

The method consists of adding an effective amount of random terpolymer based on alkyl acrylate, aminoalkyl acrylate and alkoxyalkyl acrylate to the crude oils with API densities from 8 to 40° API at dosages comprised between 5 and 2 000 ppm, to induce the removal of emulsified water from the aforementioned crude oils.

The present disclosure will be described with reference to a specific number of examples, which should be considered as illustrative but not limiting of the disclosure. Once the random terpolymers based on alkyl acrylate, aminoalkyl acrylate and alkoxyalkyl acrylate were obtained, these were characterized by means of the following instrumental methods:

1.—Size Exclusion Chromatography (SEC), using an Agilent™ model 1100 chromatograph, with a PLgel column, and employing tetrahydrofuran (THF) as eluent, to calculate the molecular mass distribution of the polymers and the polydispersity indexes (I).

2.—$^1H$ and $^{13}C$ Nuclear Magnetic Resonance (NMR) using a Bruker™ Avance III HD spectrometer, operating at frequencies of 300 and 75 MHz, respectively, employing deuterated chloroform ($CDCl_3$) as solvent and tetramethylsilane (TMS) as reference.

3.—Fourier Transform-Infrared Spectroscopy (FTIR), obtained in a Thermo Nicolet™ AVATAR 330 spectrometer employing the method of film technique with the software OMNIC™ version 7.0.

Tables 1 and 2 display the spectroscopic characteristics of some of the random terpolymers based on alkyl acrylate, aminoalkyl acrylate, and alkoxyalkyl acrylate, which does not imply any limitation:

Table 1 shows the results for the poly(alkyl acrylate-aminoalkyl acrylate-alkoxyalkyl acrylate) ($R_1$=n-butyl, $R_2$=2-(dimethylamino)ethyl, $R_3$=2-methoxyethyl, $R_4$, $R_5$, and $R_6$=hydrogen) corresponding to the AAmE-1 series, which does not imply any limitation:

TABLE 1

Number average molecular masses ($\overline{M}_n$) determined by SEC of the random terpolymers based on alkyl acrylate, aminoalkyl acrylate, and alkoxyalkyl acrylate with 1 wt % of transfer agent for the AAmE-1 series, as well as their weight ratio and the synthesis method of each example.

| Terpolymer | Weight ratio (w/w/w) | $\overline{M}_n$ (g mol$^{-1}$) |
|---|---|---|
| AAmE-9551 | 90/05/05 | 16 574 |
| AAmE-8111 | 80/10/10 | 27 169 |
| AAmE-7211 | 70/20/10 | 15 273 |
| AAmE-7121 | 70/10/20 | 26 186 |
| AAmE-6311 | 60/30/10 | 17 445 |
| AAmE-6221 | 60/20/20 | 16 915 |
| AAmE-6131 | 60/10/30 | 21 888 |

Table 2 shows the results for the poly(alkyl acrylate-aminoalkyl acrylate-carboxyalkyl acrylate) ($R_1$=n-butyl, $R_2$=2-(dimethylamino)ethyl, $R_3$=2-methoxyethyl, $R_4$, $R_5$, and $R_6$=hydrogen) corresponding to the AAmE-2 series, which does not imply any limitation:

TABLE 2

Number average molecular masses ($\overline{M}_n$) determined by SEC of the terpolymers based on alkyl acrylate, aminoalkyl acrylate, and alkoxyalkyl acrylate with 2 wt % of transfer agent foil the AAmE-2 series, as well as their weight ratio and synthesis method of each example.

| Terpolymer | Weight ratio (w/w/w) | $\overline{M}_n$ (g mol$^{-1}$) |
|---|---|---|
| AAmE-9552 | 90/05/05 | 4 665 |
| AAmE-8112 | 80/10/10 | 15 743 |
| AAmE-7212 | 70/20/10 | 14 072 |
| AAmE-7122 | 70/10/20 | 24 335 |
| AAmE-6312 | 60/30/10 | 16 838 |

TABLE 2-continued

Number average molecular masses ($\overline{M}_n$) determined by SEC of the terpolymers based on alkyl acrylate, aminoalkyl acrylate, and alkoxyalkyl acrylate with 2 wt % of transfer agent foil the AAmE-2 series, as well as their weight ratio and synthesis method of each example.

| Terpolymer | Weight ratio (w/w/w) | $\overline{M}_n$ (g mol$^{-1}$) |
|---|---|---|
| AAmE-6222 | 60/20/20 | 13 206 |
| AAmE-6132 | 60/10/30 | 14 100 |

Examples

The following examples are presented to illustrate the spectroscopic characteristics of terpolymers based on alkyl acrylate, aminoalkyl acrylate, and alkoxyalkyl acrylate applied as dehydrating agents of crude oils with API densities between 8 and 40° API. These examples should not be considered as limitation of what is hereby claimed.

AAmE-1 and AAmE-2 series

Random terpolymers based on alkyl acrylate, aminoalkyl acrylate, and alkoxyalkyl acrylate, IR. ν cm$^{-1}$: 3 440, 3 300, 2 960, 2 875, 1 732, 1 595, 1 454, 1 378, 1 251, 1 060.

$^1H$ NMR δ (ppm): 4.19, 4.03, 4.02, 3.87, 3.86, 3.56, 3.36, 3.13, 2.29, 1.64, 1.59, 1.44, 1.37 and 0.93.

$^{13}C$ NMR δ (ppm): 174.5, 70.21, 64.43, 63.27, 62.41, 62.39, 58.76, 57.76, 56.62, 55.41, 51.35, 43.72, 41.35, 36.60, 33.90, 30.59, 19.09 and 13.75.

Evaluation of the Random Terpolymers Based on Alkyl Acrylate, Aminoalkyl Acrylate, and Alkoxyalkyl Acrylate as Dehydrating Agents of Crude Oils with API Densities Between 8 and 40° API.

In order to assess the water removal efficiency of the synthesized random terpolymers, a solution of each dry terpolymer was prepared, with concentration between 5.0 and 50.0 wt %. For their preparation, solvents with boiling point in the range from 35 to 200° C. were employed, such as dichloromethane, methanol, ethanol, isopropanol, chloroform, benzene, toluene, xylene, jet fuel, and naphtha. These can be used individually or as a mixture, thus small volume of the solution was added and, likewise, the possible effects of solvent over the efficiency of random acrylic terpolymers as demulsifying agents were eliminated. Terpolymers were assessed at concentrations in the range from 5 to 2 000 ppm, in addition to two commercial products widely used in the oil industry (FD-1 and F-46). It should be mentioned that FD-1 commercial product is made up of four polymers based on polyethers (dehydrating basics), with a different PPO/PEO ratio weight (w/w), which makes it more expensive than the terpolymers based on alkyl acrylate, aminoalkyl acrylate, and alkoxyalkyl acrylate. Furthermore, the fact that the terpolymers of this disclosure possess the three required functions of a demulsifier (breaking, coalescence and clarification), without the necessity of being mixed with another product and, that only one reactive stage is required for their synthesis, represents another clear advantage of these novel random acrylic terpolymers against the commercial formulations. Table 3 shows the properties of the polymers based on polyethers that comprise the FD-1 commercial formulation. Concerning the F-46 demulsifier, it consists of an arylsulfonate oxyalkylated ethylene formaldehyde resin, which also contains alcohols such as isopropanol and methanol, besides of alkali metals halides —NaCl or KCl—.

TABLE 3

Polyethers that comprise the FD-1 commercial formulation, including the number average molecular mass ($\overline{M}_n$) and PPO/PEO ratio (w/w).
FD-1 Formulation

| Key name | $\overline{M}_n$ (g mol$^{-1}$) | PPO/PEO ratio (w/w) |
|---|---|---|
| TP 89 | 7750 | 90/10 |
| TP 03 | 5330 | 70/30 |
| TP 14 | 3050 | 60/40 |
| TP 71 | 1400 | 90/10 |

To carry out the evaluation as demulsifying agents of the random terpolymers based on alkyl acrylate, aminoalkyl acrylate and alkoxyalkyl acrylate, as well as the commercial products, the following methodology was used: the required aliquot of the synthesized random terpolymers based on alkyl acrylate, aminoalkyl acrylate and alkoxyalkyl acrylate, as well as, the commercial products (FD-1 and F-46), were added to oblong bottles provided with insert and cover—one of these was labeled as blank (without demulsifying product)—. Subsequently, 100 mL of crude oil was poured at each oblong bottle. At this moment, the first reading of the amount of removed water was done; afterwards, the oblong bottles were placed in a controlled-temperature bath. The water-in-crude oil emulsion breakdown was measured every 5 min during the first hour; subsequently, every half hour during the second hour of the assessment and, lastly, every hour until the end of the assessment (5 h). All the random terpolymers of this disclosure and the commercial products were assessed at different concentrations within the range from 5 to 2 000 ppm.

Table 4 displays the physicochemical characterization of crude oils employed to evaluate the performance as demulsifier agents of the random terpolymers based on alkyl acrylate, aminoalkyl acrylate and alkoxyalkyl acrylate.

TABLE 4

Physicochemical characterization and SARA analysis of crude oils employed in dehydrating procedures.

| Property | K'anal-1 | K'anal-2 | K'anal-3 |
|---|---|---|---|
| API gravity (°) | 16.4 | 15.4 | 34.4 |
| Salt content (lb mbb$^{-1}$) | 307 | 998 | 6076 |
| Runoff temperature (° C.) | −18 | −15 | <−45 |
| Distillation water (vol %) | 1.42 | 3.00 | 0.15 |
| Water and sediments (vol %) | 1.50 | 3.50 | 0.15 |
| Kinematic viscosity (mm$^2$ s$^{-1}$) @ 25° C. | 2196.0 | 3614.0 | 7.8 |
| Number average molecular mass by cryoscopy (g · mol$^{-1}$) | 376 | 390 | 224 |
| SARA analyses | | | |
| Saturates (wt %) | 10.49 | 14.16 | 29.34 |
| Aromatics (wt %) | 39.43 | 39.28 | 52.19 |
| Resins (wt %) | 33.69 | 30.11 | 16.68 |
| Asphaltenes (wt %) | 16.38 | 16.41 | 1.76 |

As an example, which does not imply any limitation, FIGS. 1, 3, 5, 7, and 9 show the results of the water removal efficiency as a function of time; while in FIGS. 2, 4, 6, 8, 10, and 11 display the images of bottles after the evaluation, as well as the respective micrographs that show the residual emulsions.

FIG. 1 shows the efficiencies of the random terpolymers based on alkyl acrylate, aminoalkyl acrylate and alkoxyalkyl acrylate with 1 wt % of transfer agent (AAmE-1) in the K'anal-1 crude oil (16.40° API) dosed at 500 ppm. In this assessment, the AAmE-6311 and AAmE-7211 terpolymers displayed the highest water removal efficiencies, 90 and 86 vol %, respectively. The FD-1 commercial formulation removed 79 vol % of the emulsified water, with a coalescence rate comparable to that of AAmE-6221, which managed to remove 1 vol % more than the aforesaid product. On the other hand, even though the AAmE-7121 terpolymer displayed lower coalescence rate than the two demulsifiers mentioned earlier, at the end of the test, it was able to remove 2 vol % more than FD-1. Finally, the F-46 commercial demulsifier displayed the lowest coalescence rate, barely removing 57 vol %.

Figure 2:
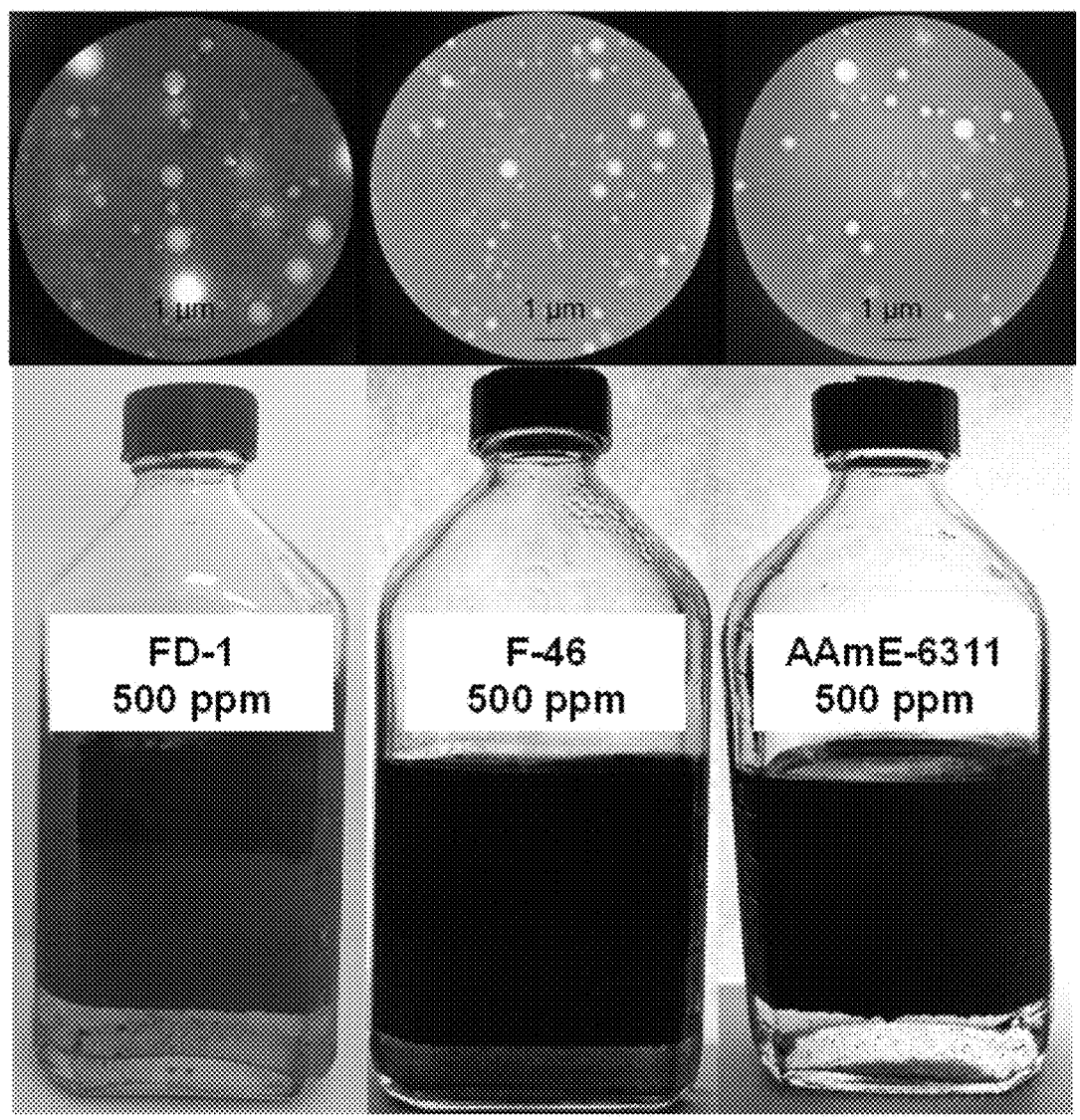
FIG. 2 shows the images of bottles and micrographs corresponding to the K'anal-1 crude oil (16.4° API), treated with the AAmE-6311 random terpolymer based on alkyl acrylate, aminoalkyl acrylate and alkoxyalkyl acrylate, FD-1 commercial formulation and F-46 commercial product at a dosage of 500 μm.
Figure 3:
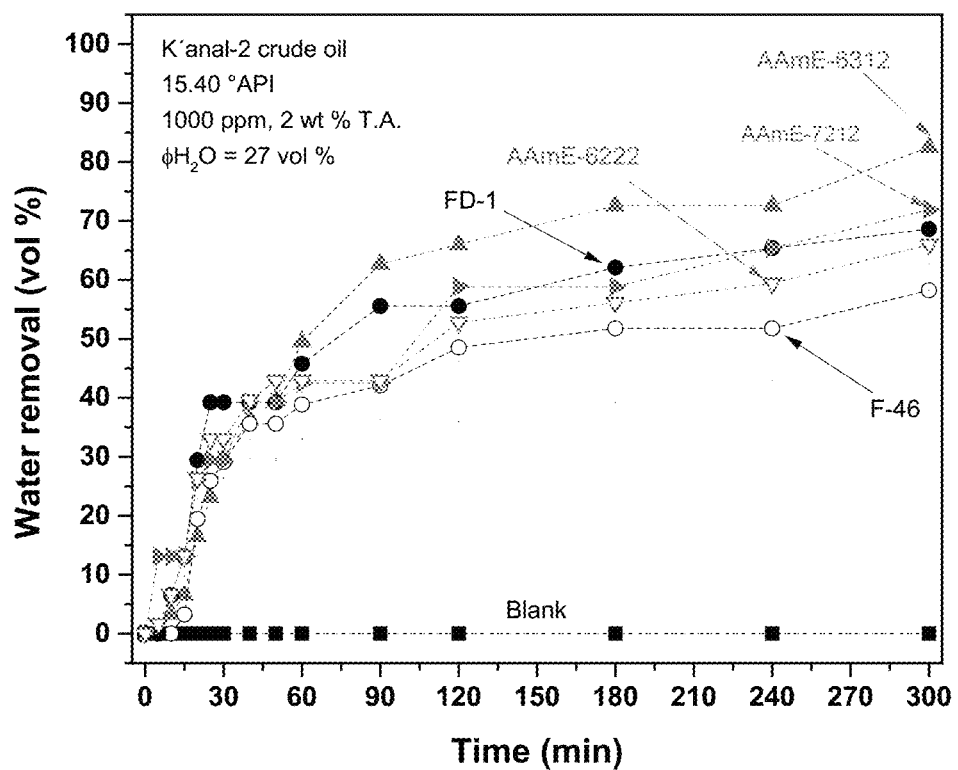
FIG. 3 presents the water removal efficiencies of the random terpolymers of AAmE-2 series based on alkyl acrylate, aminoalkyl acrylate and alkoxyalkyl acrylate synthesized with 2 wt % of transfer agent, dosed in the K'anal-2 crude oil (15.4° API) at a concentration of 1000 ppm.

FIG. 2 shows the superior clarifying capacity of the AAmE-6311 terpolymer, which also generates a well-defined and homogeneous interface between the water and the crude oil. In contrast, the clarifying capacity of the FD-1 commercial formulation was slightly lower with respect to the terpolymer; while the F-46 commercial product presented the worst clarification, despite that the interface of both commercial demulsifiers was homogeneous.

Regarding the micrographs, in all cases were still observed water-in-crude oil emulsions, with a polydisperse droplet size. The FD-1 commercial formulation displayed the largest droplet size of remaining water—0.8 μm—, followed by F-46—0.1-0.5 μm—; both treated crude oils with a higher amount of remaining water compared with the micrograph of the sample treated with the AAmE-6311 terpolymer—highest performance as demulsifier—, which showed droplet sizes of remaining water between 0.3 and 0.7 μm. AAmE terpolymers with 2 wt % of transfer agent (AAmE-2) assessed at 1000 ppm in the K'anal-2 crude oil (15.40° API), allowed obtaining the results displayed in FIG. 3. The AAmE-6312 terpolymer showed the best performance as demulsifier, removing 82 vol % at 300 min, followed by the AAmE-7212 terpolymer, that achieved a removal of 72 vol %, surpassing the FD-1 and F-46 commercial products, which only removed 69 and 58 vol %, respectively; despite having shown a similar coalescence rate during the first 50 min of assessment. Finally, the AAmE-6222 terpolymer displayed a similar performance to AAmE-7212 up to 90 min of the assessment, surpassing the F-46 product in coalescence rate and removed water, 66 vol %.

Figure 4:
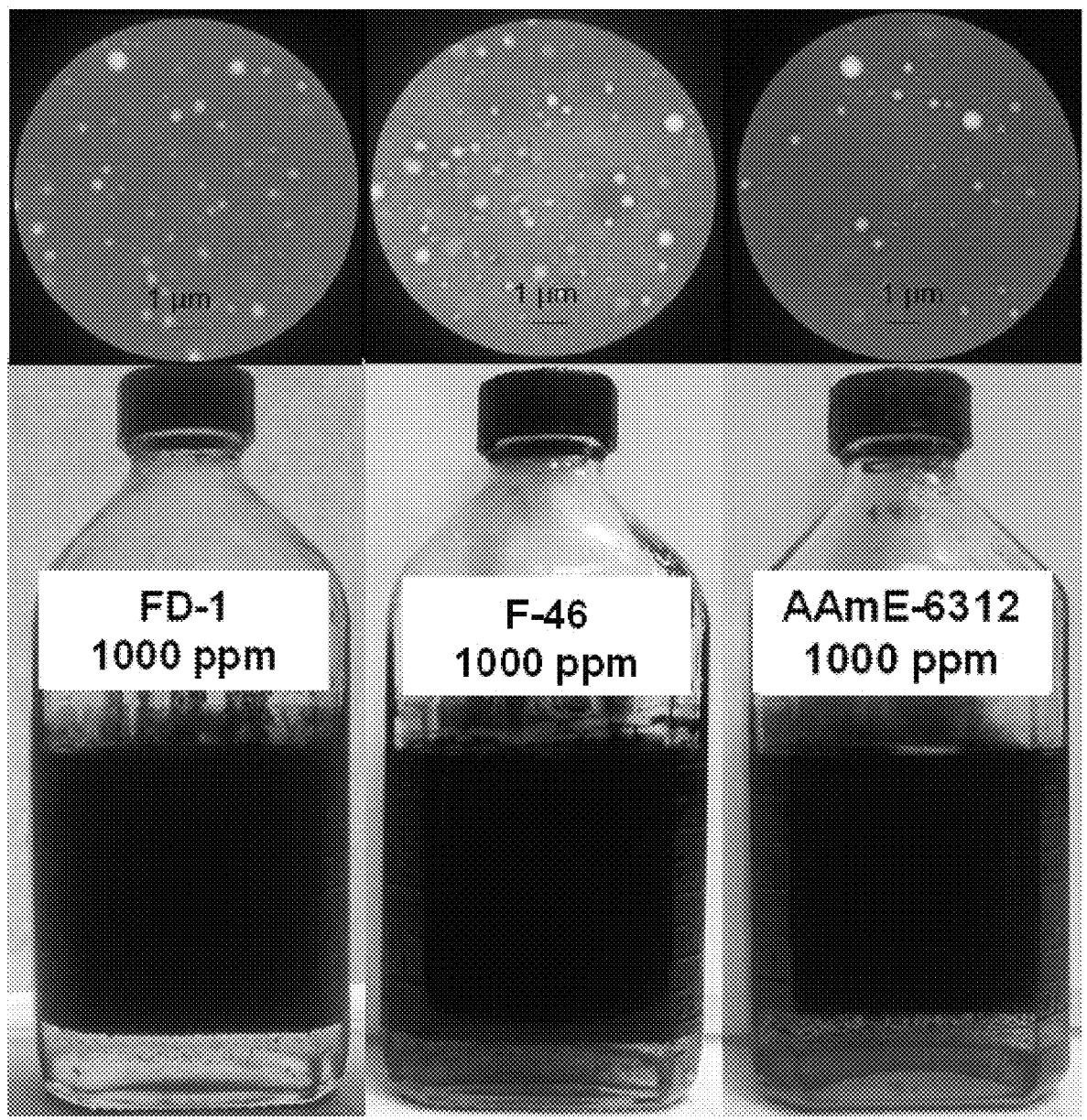
FIG. 4 displays the images of bottles and micrographs of the remaining emulsion in the K'anal-2 crude oil (15.4° API) after the treatment with the AAmE-6312 random terpolymer, FD-1 commercial formulation and F-46 commercial product, all at a dosage of 1000 ppm.

FIG. 4 shows the exceptional clarifying capacity of the AAmE-6312 terpolymer, in contrast with that of the FD-1 formulation and F-46 commercial products. Likewise, it is notorious that the acrylic terpolymer induces a well-defined and homogeneous interface, comparable to both commercial products. It can be observed in the micrograph of treated crude oil with the FD-1 formulation remaining water-in-crude oil emulsion with water drop size of less than 1 μm, as well as the presence of organic agglomerates—possibly of paraffins dispersed in the crude oil—. On the other hand, the micrograph of crude oil treated with the F-46 commercial demulsifier allows observing a polydisperse emulsion with a high proportion of water droplets around of 1 μm. In contrast, the crude oil sample after being treated with the AAmE-6132 terpolymer shows a remaining emulsion with low polydispersity in water droplet size between 0.2 and 1.0 μm.

Figure 5:
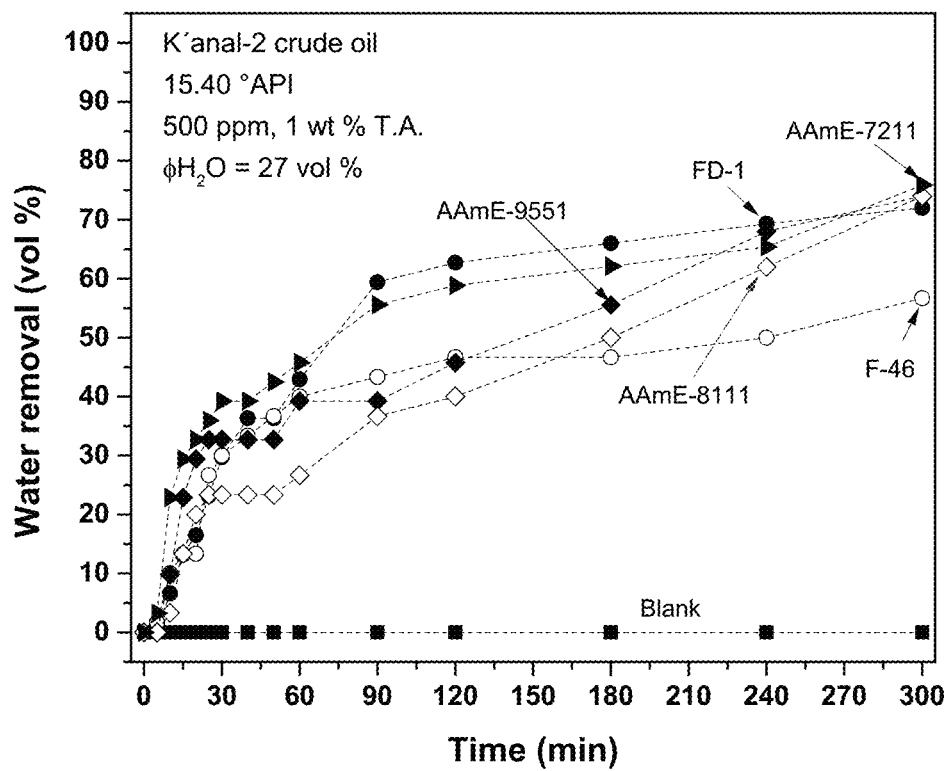
FIG. 5 reports the performance as demulsifying agents of the AAmE-9551, AAmE-8111 and AAmE-7211 terpolymers based on alkyl acrylate, aminoalkyl acrylate and alkoxyalkyl acrylate synthesized with 1 wt % of transfer agent, compared with the FD-1 commercial formulation and F-46 commercial product in the K'anal-2 crude oil (15.4° API), dosed at 500 ppm.

The assessment of the random terpolymers based on alkyl acrylate, aminoalkyl acrylate, and alkoxyalkyl acrylate with 1 wt % of transfer agent (AAmE-1), dosed at 500 ppm in the K'anal-2 crude oil (15.4° API) are shown in FIG. 5. In this evaluation, the AAmE-7211 terpolymer displayed the highest removal efficiency, 76 vol %, surpassing by 2 vol % the FD-1 commercial formulation; although both products showed similar coalescence rate. On the other hand, the AAmE-8111 and AAmE-9551 terpolymers achieved water removal efficiencies of 74 vol %, despite that during the first 240 min both displayed lower coalescence rate than the FD-1 formulation and AAmC-7211 random terpolymer. Finally, the F-46 commercial demulsifier and AAmE-9551 displayed similar coalescence rate during the first 120 min of the assessment; yet, the acrylic terpolymer exhibited, at the end, the lowest demulsifying efficiency scarcely removing 57 vol %.

Figure 6:
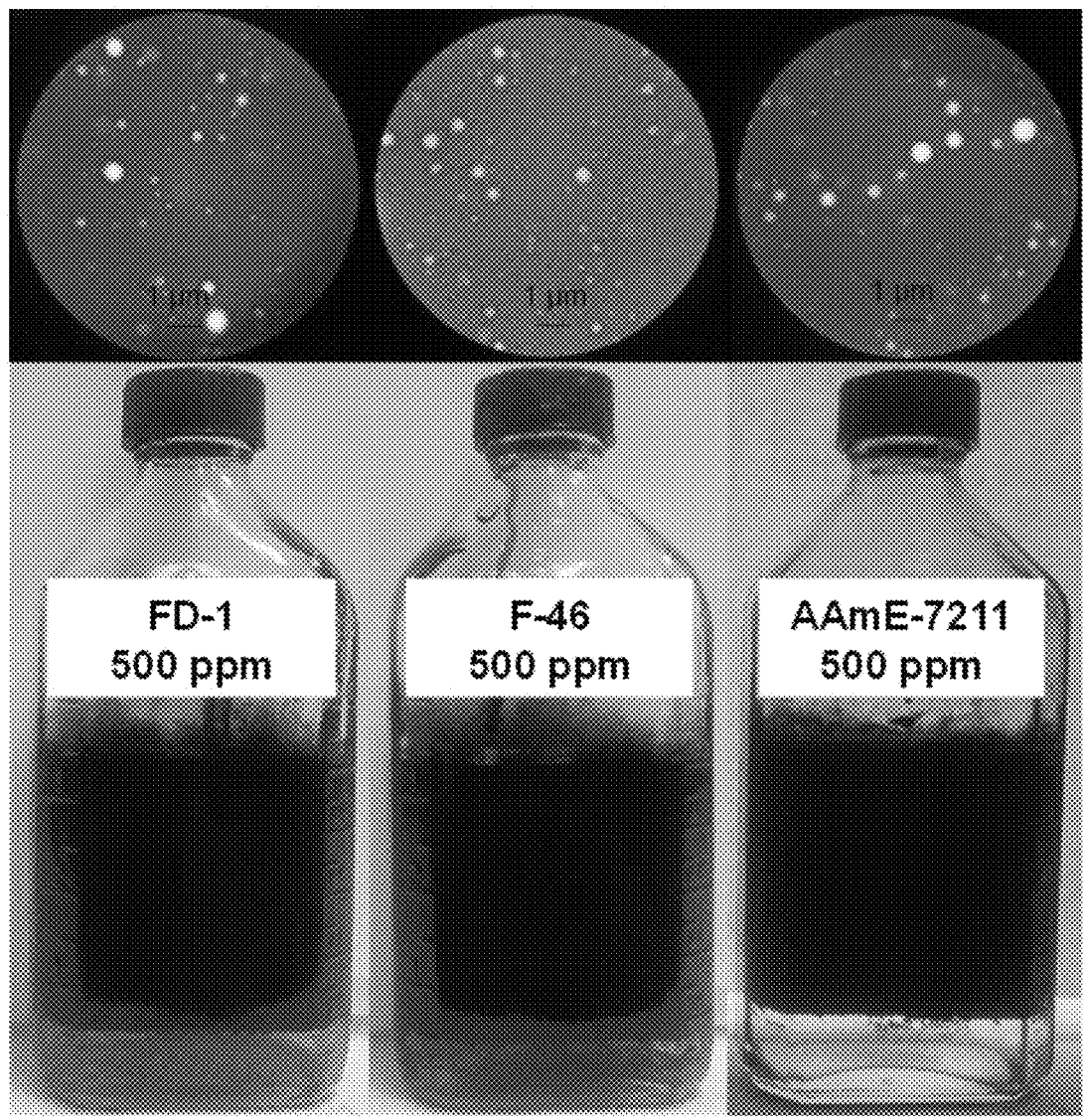
FIG. 6 shows the images of bottles and micrographs of the K'anal-2 crude oil (15.4° API) treated with the AAmE-7211 random terpolymer, FD-1 commercial formulation and F-46 commercial product, all dosed at a concentration of 500 ppm.

FIG. 6 shows the good clarifying capacity of the removed water by the AAmE-7211 terpolymer, being comparable to that of the FD-1 formulation and the F-46 demulsifier. Likewise, the created water/oil interface by the terpolymer is homogeneous, same as that of the commercial products. On the other hand, in the crude oil micrographs, after the application of the FD-1 formulation and the novel AAmE-7211 terpolymer, it could be observed in both a less amount of water compared with the micrograph of the treated crude oil with the F-46 commercial demulsifier; all of them showed residual emulsions with water droplet size between 0.16 and 0.75 μm.

Figure 7:
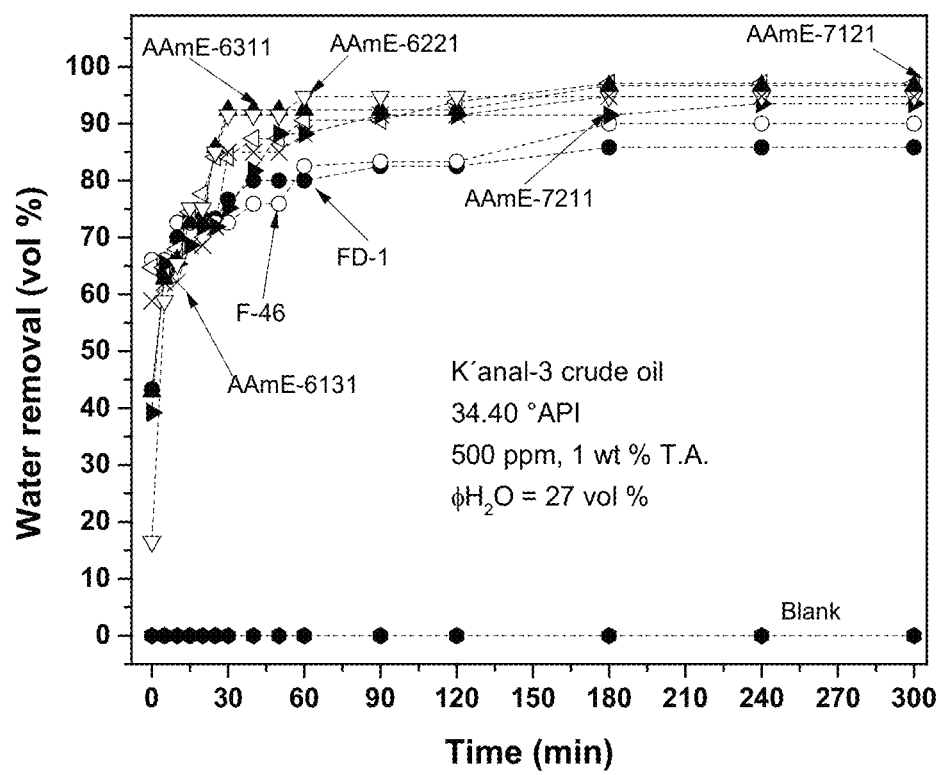
FIG. 7 shows the water removal efficiencies of random terpolymers of AAmE-1 series based on alkyl acrylate, aminoalkyl acrylate and alkoxyalkyl acrylate, in the K'anal-3 crude oil (34.4° API), at a dosage of 500 ppm.

FIG. 7 shows the performance of the AAmE terpolymers with 1 wt % of transfer in the K'anal-3 crude oil at a dosage of 500 ppm. The AAmE-7121, AAmE-6311, and AAmE-6221 terpolymers achieved a water removal of 97 vol % and showed a similar coalescence rate among themselves; however, the AAmE-7121 and F-46 products were the first ones to destabilize the emulsion. On the other hand, the AAmE-6311 terpolymer displayed lower coalescence rate than the previously described terpolymers; nonetheless, it managed to destabilize the emulsion before the AAmE-7211 terpolymer and reached a maximal water removal of 95 vol %, after 180 min of assessment, surpassing the AAmE-7211 terpolymer by 1 vol %. Finally, the FD-1 commercial formulation and the F-46 commercial demulsifier showed the lowest coalescence rates, removing 86 and 90 vol % at 180 min of assessment, respectively.

Figure 8:
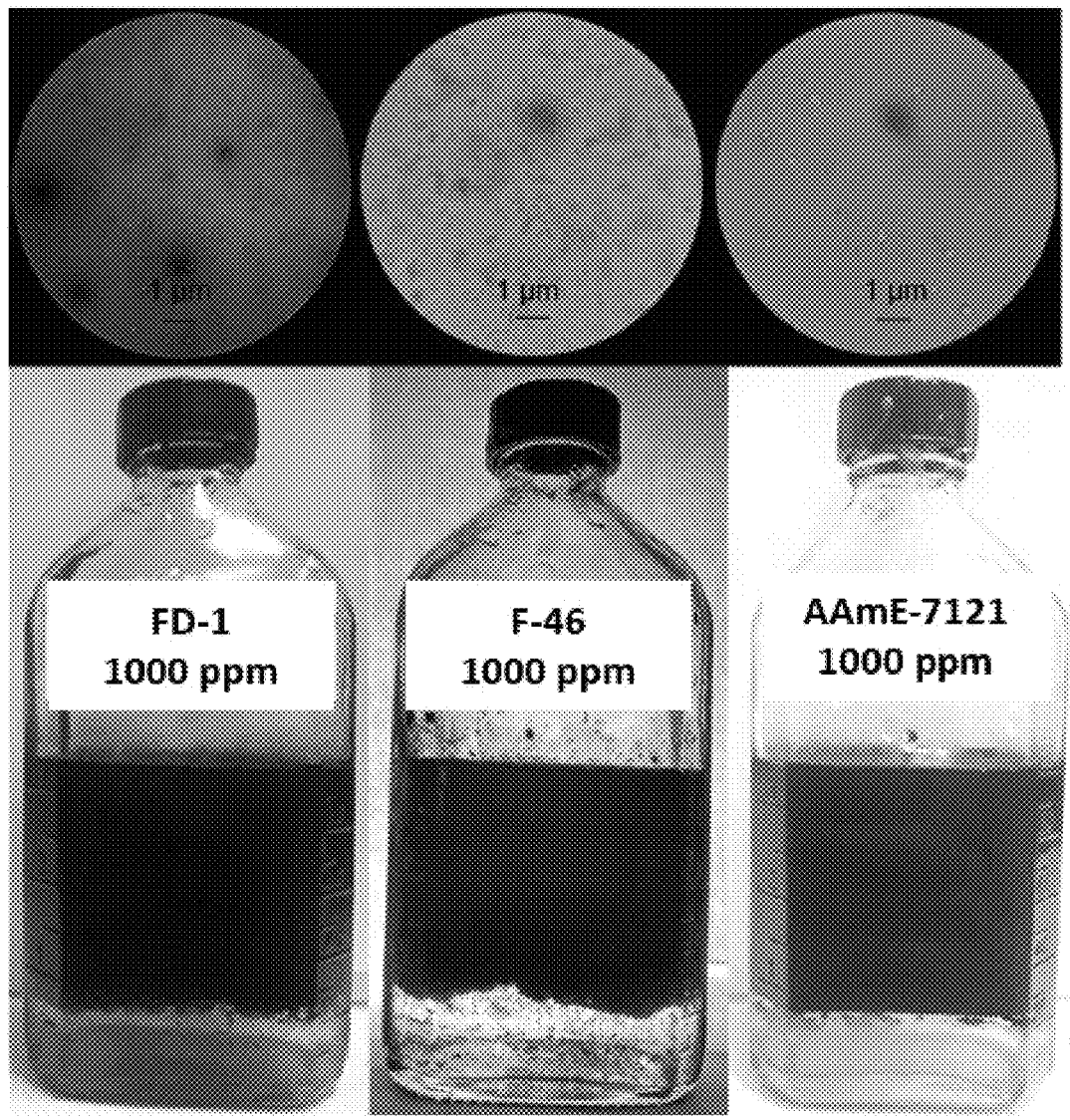
FIG. 8 shows the images of bottles and micrographs corresponding to the K'anal-3 crude oil (34.4° API) after the evaluation of AAmE-7121 random terpolymer based on alkyl acrylate, aminoalkyl acrylate and alkoxyalkyl acrylate, FD-1 commercial formulation and F-46 commercial product at 500 ppm.

FIG. 8 displays that the clarifying capacity of the AAmE-7121 terpolymer is slightly higher, in comparison with that of the FD-1 formulation and the F-46 demulsifier. Similarly, it can be observed that the previous terpolymer is up to generating a well-defined and homogeneous water/crude oil interface in contrast with the poorly homogeneous interface generated by the commercial products. Regarding the micrographs at the end of assessment, it can be seen that the water droplet size is slightly larger when FD-1 is dosed, compared with that when F-46 is dosed. About the remaining emulsion after the treatment with the AAmE-7121 terpolymer, the water droplet size is quite similar to that of F-46, though with a lower amount of emulsified water than with the aforesaid; besides it is observed the presence of organic aggregates, possibly of paraffins.

Figure 9:
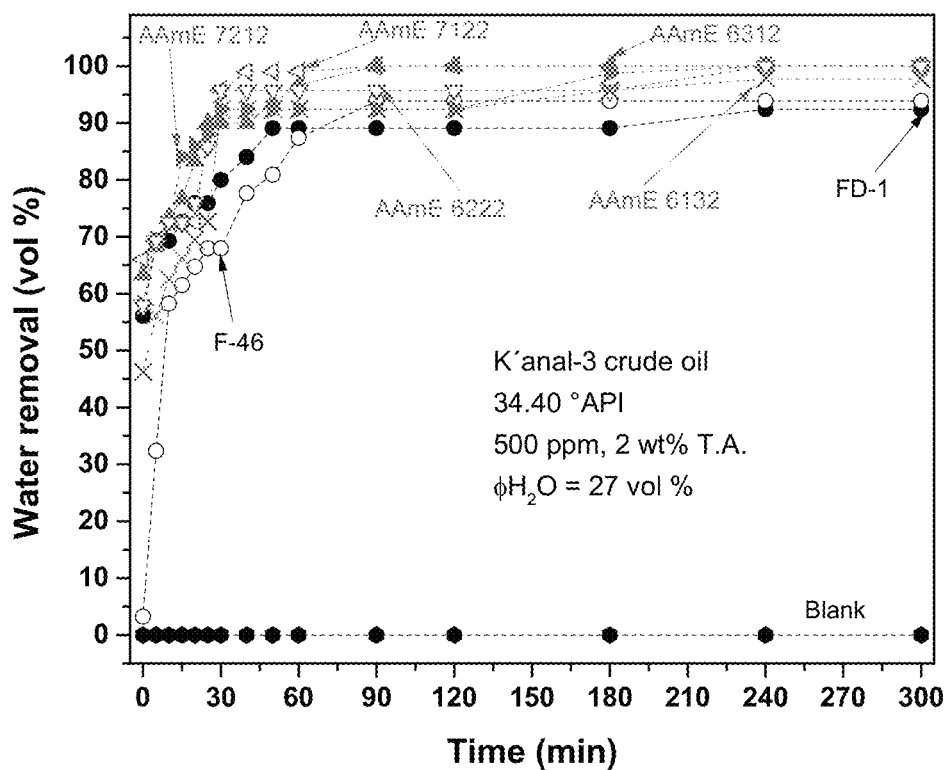
FIG. 9 reports the water removal efficiencies of random terpolymers of AAmE-2 series based on alkyl acrylate, aminoalkyl acrylate and alkoxyalkyl acrylate in the K'anal-3 crude oil (34.4° API), at a concentration of 500 ppm.

Regarding the K'anal-3 crude oil (34.4° API), the performance of the AAmE-2 series, dosed at 500 ppm, is reported in FIG. 9. The FD-1 commercial formulation—93 vol %—and F-46 commercial product—94 vol %—were surpassed by the novel random terpolymers, which removed all the emulsified water. It should be highlighted that AAmE-7122 and AAmE-6312 displayed the best performance as breakers separating 66 and 63 vol % at the beginning of the assessment, followed by AAmE-7212 and AAmE-6222 with 58 vol %. Both terpolymers were able to exceed the coalescence rate of FD-1 at 20 and 30 min, which barely removed 92 vol %. AAmE-6132 showed the lowest coalescence rate of all random terpolymers; nevertheless, it exceeded the coalescence rate and water removal efficiency of the commercial products, removing 98 vol % at 240 min of evaluation. Finally, the F-46 commercial product displayed the worst performance as breaker and coalescer, reaching its maximum efficiency at 90 min.

Figure 10:
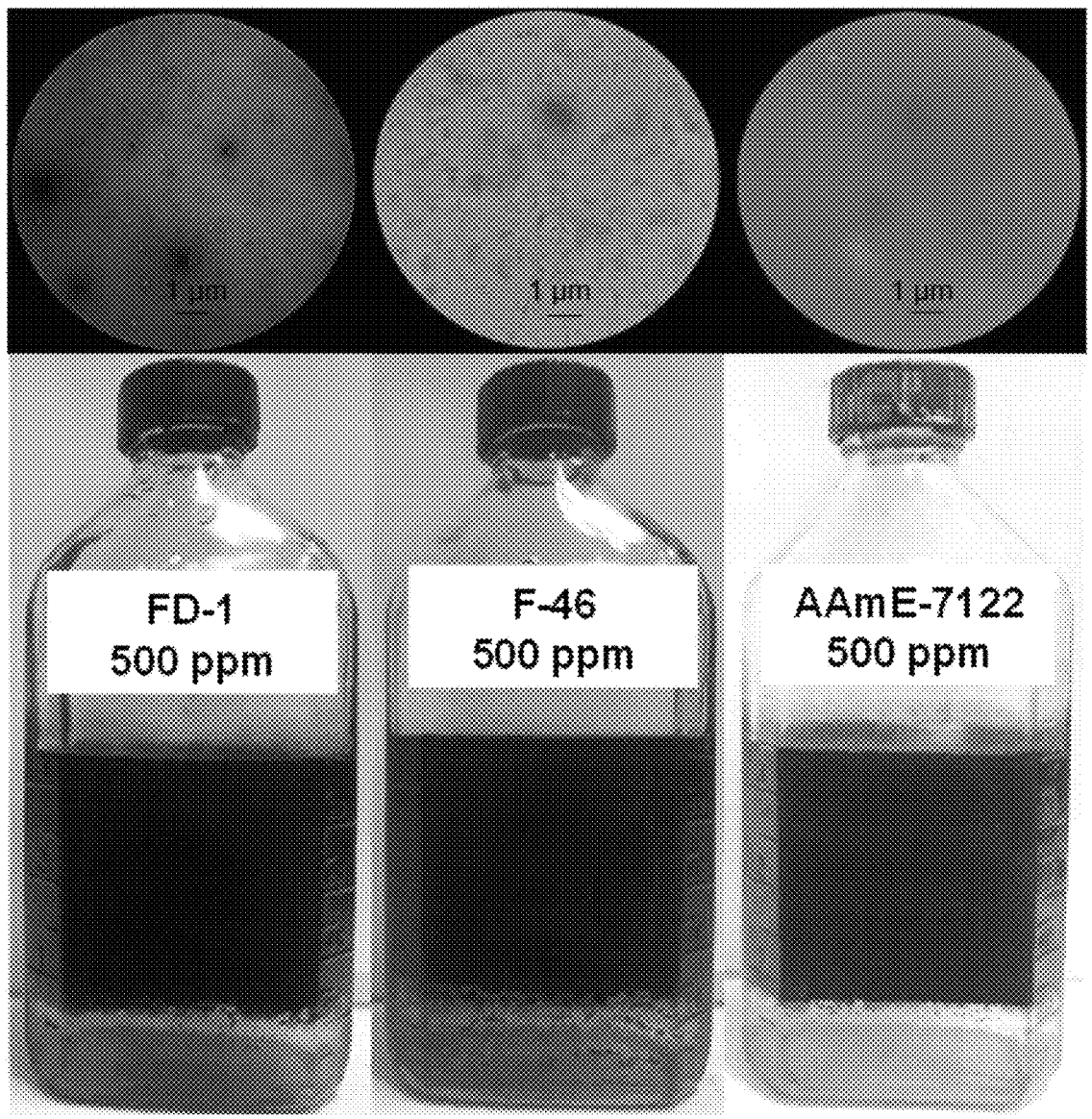
FIG. 10 displays the images of bottles and micrographs of the K'anal-3 crude oil (34.4° API) after the assessment of AAmE-7122 random terpolymer based on alkyl acrylate, aminoalkyl acrylate and alkoxyalkyl acrylate, FD-1 commercial formulation and F-46 commercial product.
Figure 11:
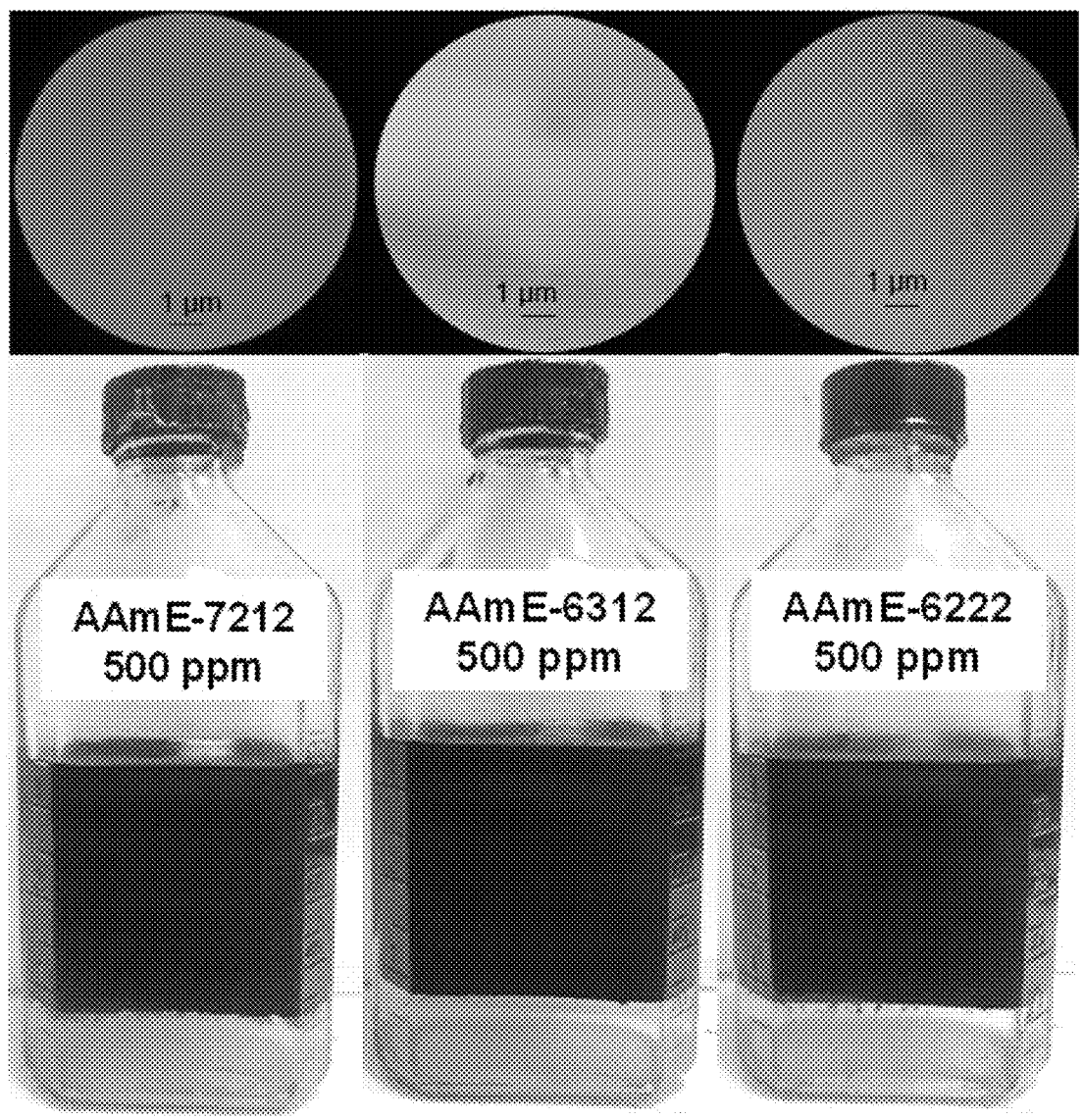
FIG. 11 shows the images of bottles and micrographs of the K'anal-3 crude oil (34.4° API) after the evaluation of AAmE-7212, AAmE-6312 and AAmE-6222 random terpolymers based on alkyl acrylate, aminoalkyl acrylate and alkoxyalkyl acrylate.

FIGS. 10 and 11 show the well-defined interfaces induced by the AAmE-7122, AAmE-7212, AAmE-6312, and AAmE-6222 terpolymers, which are comparable to the interfaces generated by the FD-1 and F-46 products. Similarly, it is observed the excellent clarifying capacity of all the previous terpolymers, which is slightly higher than that of the commercial formulations, making the random acrylic terpolymers an excellent alternative as demulsifier agents of high efficiency.

As can be seen in the micrographs of the crude oil samples in FIG. 10, when the crude oil is treated with the commercial products, the remaining emulsions show drops of less than 0.1 μm; while the micrograph of the treated crude oil with the AAmE-7122 terpolymer does not display the presence of emulsified water, though a small amount of dispersed paraffins can be observed.

Finally, FIG. 11 highlights the excellent clarification of the removed aqueous phase with the AAmE-7212, AAmE-6312 and AAmE-6222 terpolymers; in addition, the micrographs of the crude oil samples treated with the acrylic terpolymers confirm the total removal of the emulsified water.

The invention claimed is:

1. A dehydrating agent of crude oil comprising a random terpolymer based on a combination of at least one alkyl acrylate, at least one aminoalkyl acrylate monomer in an amount between about 5.0 and about 49.5 wt % in the random terpolymer, and at least one alkoxyalkyl acrylate, wherein the terpolymer consists of structural formula (1) and has a number average molecular mass (Mn) from about 1,000 to about 450,000 g mol-1, wherein structural formula (1) is as follows:

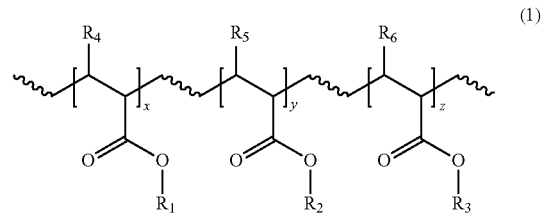

(1)

wherein:
$R^1$, $R^2$, $R^3$, $R^4$, $R^5$ and $R^6$ are independent radicals and wherein:
$R^1$=methyl, ethyl, n-butyl, iso-butyl, tert-butyl, pentyl, n-hexyl, 2-ethylhexyl, 3,5,5-trimethylhexyl, n-octyl, iso-octyl, n-decyl, isodecyl, 10-undecenyl, tert-butyl-cyclohexyl, n-dodecyl, n-octadecyl, tridecyl, or behenyl;
$R^2$=methylamine, 2-ethylamine, 3-propylamine, 2-(dimethylamino)ethyl, 2-(diethylamino)ethyl, 3-(dimethylamino) propyl, or N-morpholinyl ethyl;
$R^3$=methoxymethyl, 2-methoxyethyl, ethoxymethyl, 2-ethoxyethyl, 3-methoxypropyl, 3-ethoxypropyl, 2-(2-methoxyethoxy)ethyl, butoxyethyl; and
$R^4$, $R^5$, and $R^6$=H (hydrogen) and/or $CH_3$ (methyl);

wherein:
x is a number from 4 to 900,
y is a number from 4 to 900,
z is a number from 4 to 900, and
the "x," "y," and "z" polymer units occur in random sequences,
wherein the random terpolymer destabilizes water-in-oil (W/O) emulsions, so as to remove emulsified water and salts dissolved in the emulsions, thereby being effective as a dehydrating agent of crude oil.

2. The dehydrating agent of crude oil according to claim 1, wherein the random terpolymer comprises the at least one alkyl acrylate monomer in an amount between about 50.0 and about 99.0 wt %, and the at least one alkoxyalkyl acrylate monomer in an amount between about 0.5 and about 49.5 wt %.

3. The dehydrating agent of crude oil according to claim 2, wherein the at least one alkyl acrylate monomer is selected from the group consisting of methyl acrylate, ethyl acrylate, butyl acrylate, pentyl acrylate, isobutyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, isodecyl acrylate, decyl acrylate, lauryl acrylate, tridecyl acrylate, octadecyl acrylate and behenyl acrylate, and combinations thereof.

4. The dehydrating agent of crude oil according to claim 2, wherein the at least one aminoalkyl acrylate monomer is selected from the group consisting of 2-aminoethyl acrylate, 2-(dimethylamino)ethyl acrylate, 3-aminopropyl acrylate, 3-(dimethylamino) propyl acrylate, 2-(diethylamino)ethyl acrylate, 2-N-ethylmorpholine acrylate, and combinations thereof.

5. The dehydrating agent of crude oil according to claim 2, where the at least one alkoxyalkyl acrylate monomer is selected from the group consisting of 2-methoxyethyl acrylate, 2-ethoxyethyl acrylate, 2-butoxyethyl acrylate, 2-ethoxymethyl acrylate, and combinations thereof.

6. A dehydrating formulation comprising the dehydrating agent of crude oil according to claim 1, wherein a concentration of dry random terpolymer based on the combination of at least one alkyl acrylate, at least one aminoalkyl acrylate, and at least one alkoxyalkyl acrylate in the dehydrating formulation ranges from about 5.0 to about 50.0 wt %.

* * * * *